(12) United States Patent
Thomas et al.

(10) Patent No.: US 11,826,850 B2
(45) Date of Patent: Nov. 28, 2023

(54) SYSTEM AND METHOD FOR MANUFACTURING A BUSBAR

(71) Applicant: Transportation IP Holdings, LLC, Norwalk, CT (US)

(72) Inventors: Jeffrey Thomas, Erie, PA (US); James Pfendler, Erie, PA (US); Gregory Badders, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 54 days.

(21) Appl. No.: 17/540,471

(22) Filed: Dec. 2, 2021

(65) Prior Publication Data

US 2022/0193818 A1 Jun. 23, 2022

Related U.S. Application Data

(60) Provisional application No. 63/128,557, filed on Dec. 21, 2020.

(51) Int. Cl.
*H01M 50/507* (2021.01)
*B23K 26/00* (2014.01)
*B23K 26/21* (2014.01)
*B23K 101/38* (2006.01)

(52) U.S. Cl.
CPC ......... *B23K 26/0093* (2013.01); *B23K 26/21* (2015.10); *H01M 50/507* (2021.01); *B23K 2101/38* (2018.08); *H01M 2220/20* (2013.01)

(58) Field of Classification Search
CPC ........... B23K 2101/38; B23K 26/0093; B23K 26/21; H01M 10/0404; H01M 2220/20; H01M 50/503; H01M 50/507; H01M 50/516
See application file for complete search history.

(56) References Cited

U.S. PATENT DOCUMENTS

| 2005/0031946 | A1* | 2/2005 | Kruger | H01M 50/557 429/208 |
| 2013/0054061 | A1* | 2/2013 | Nishimoto | H01M 50/446 429/246 |
| 2020/0259158 | A1 | 8/2020 | Motohashi | |
| 2021/0283670 | A1* | 9/2021 | Austin | B21D 5/16 |

FOREIGN PATENT DOCUMENTS

| EP | 1659651 A1 | 5/2006 |
| EP | 3062365 A1 | 8/2016 |
| EP | 3340345 A1 | 6/2018 |
| WO | 2013191480 A2 | 12/2013 |

OTHER PUBLICATIONS

European Search Report for related European Patent Application No. 21216033.7 dated May 13, 2022 (6 pages).

* cited by examiner

*Primary Examiner* — Victoria H Lynch
(74) *Attorney, Agent, or Firm* — THE SMALL PATENT LAW GROUP LLC; Josef L. Hoffmann

(57) ABSTRACT

An assembly that may include a press that may form an indentation within a tab, a roller assembly including a rolling element that may compress a first tab portion of the tab that extends from the indentation against a busbar, and a welding device that may weld the first tab portion of the tab to the busbar.

20 Claims, 6 Drawing Sheets

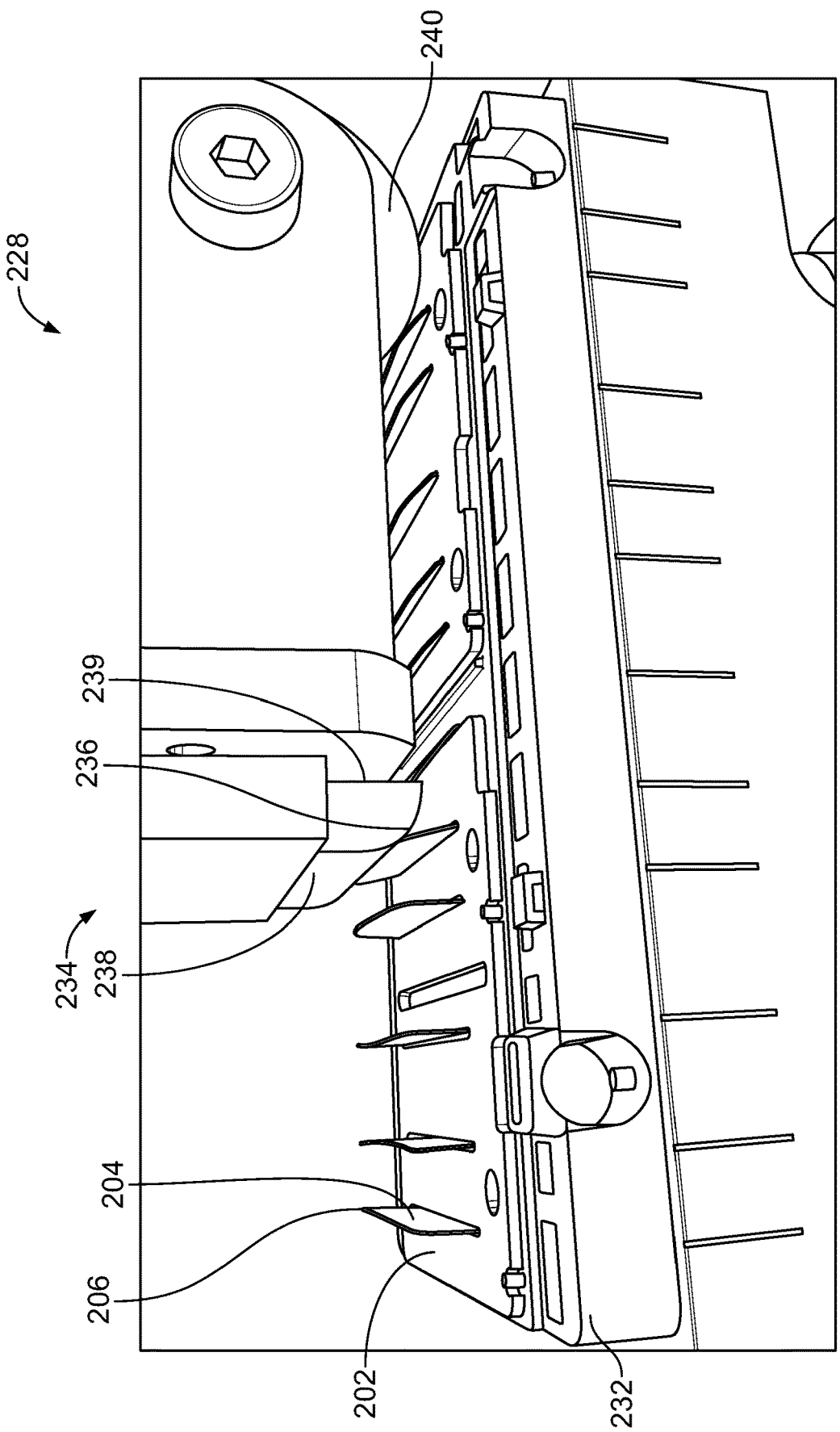

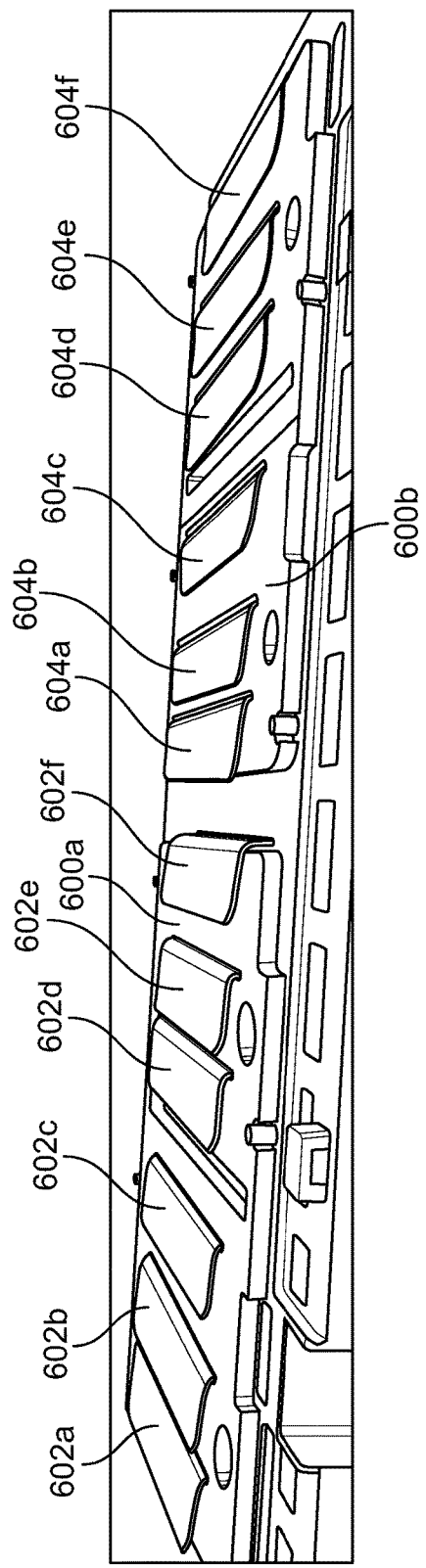
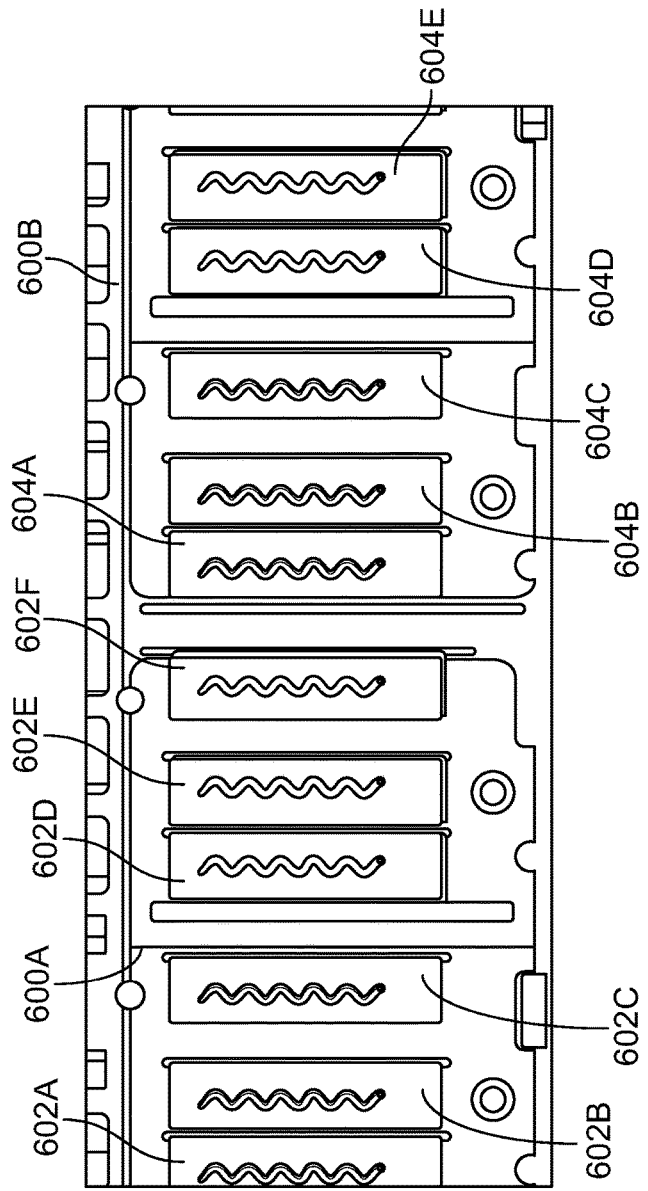
FIG. 6B
FIG. 6C

SYSTEM AND METHOD FOR MANUFACTURING A BUSBAR

CROSS REFERENCE

This application claims priority to U.S. Provisional Application No. 63/128,557, which was filed on 21 Dec. 2020, and the entire disclosure of which is incorporated herein by reference.

BACKGROUND

Technical Field

The subject matter described relates to systems and methods for manufacturing a busbar.

Discussion of Art

Busbars for high current power distribution often are used to connect low voltage equipment in battery banks. To provide electrical connections, tabs are typically used that are able to connect the busbar to the low voltage equipment. Tabs often are placed on the busbar extending upward from the busbar for electrical connection. However, having these upwardly extending tabs is undesirable for packaging, such as when limited space is provided within a package. In addition, the tabs can also interfere with internal foil of a battery cell when compliance occurs, resulting in tearing of the foil and consequently the failure of the battery cell. Therefore, a need may exist for busbar manufacturing process and system that differs from those currently known.

BRIEF DESCRIPTION

In one or more embodiments, a method is provided that includes indenting a tab that may be coupled to a busbar for a battery to form a first tab portion and a second tab portion separated by an indentation, compressing the first tab portion against the busbar by bending the first tab portion about the indentation, and securing the first tab portion to the busbar.

In one or more embodiments, an assembly is provided that may include a press that may form an indentation within a tab, a roller assembly including a rolling element that may compress a first tab portion of the tab that extends from the indentation against a busbar, and a welding device that may weld the first tab portion of the tab to the busbar.

In one or more embodiments, a method is provided that may include indenting a tab that may be coupled to a busbar for a battery to form a first tab portion and a second tab portion separated by an indentation, and inserting the tab into an opening in the busbar such that the first tab portion extends away from the opening. The method may also include bending the first tab portion about the indentation to a welding position adjacent the busbar, and welding the first tab portion to the busbar.

BRIEF DESCRIPTION OF THE DRAWINGS

The inventive subject matter may be understood from reading the following description of non-limiting embodiments, with reference to the attached drawings, wherein below:

FIG. 4 illustrates a side plan view of a roller assembly;

FIG. 6B illustrates a side perspective view of a busbar during a manufacturing process; and FIG. 6C illustrates a side perspective view of a busbar after a manufacturing process.

DETAILED DESCRIPTION

Embodiments of the subject matter described herein relate to a system and method for manufacturing a busbar. An indentation is formed in a tab that provides electrical coupling to the busbar. The indentation is formed prior to laser welding of the busbar to a battery or other electronic component. Specifically, the indentation is formed to facilitate the bending of the tab. In this manner, a rolling element may be implemented to compress a first tab portion of the tab against the busbar prior to laser welding. In particular, laser welding can require an intimate contact of material surfaces (e.g., between the busbar and a battery cell). So, merely bending the tabs over can introduce process variation and ultimately impact the laser welding of the tabs to the busbar system. In particular, when force is placed on one end of a sheet of metal while the other end fixed, the bend may occur at differing places along the sheet. By placing the indentation in the tab before the rolling process, the indentation becomes the location where bending occurs. The indentation also functions to provide less resistance, or elasticity, compared to a sheet of metal that does not have the indentation. As a result, the indentation reduces elastic forces of the metal sheet resulting in the tab moving back towards an original position, and being spaced from the busbar after compression, instead of remaining flat against the busbar before welding occurs. In this manner, welding is improved. By providing the flattening against the busbar, the battery cell is also protected from internal foil of the battery being impacted, including foil tears, via compliance, thereby preventing battery failure caused during the welding.

The battery cell described herein may be utilized for powering a rail vehicle system, such as a locomotive. Still, not all embodiments described herein are limited to rail vehicle systems. For example, one or more embodiments of the busbar and methods described herein can be used in connection with other types of vehicles, such as automobiles, trucks, buses, mining vehicles, marine vessels, aircraft, agricultural vehicles, or the like.

Figure 1:
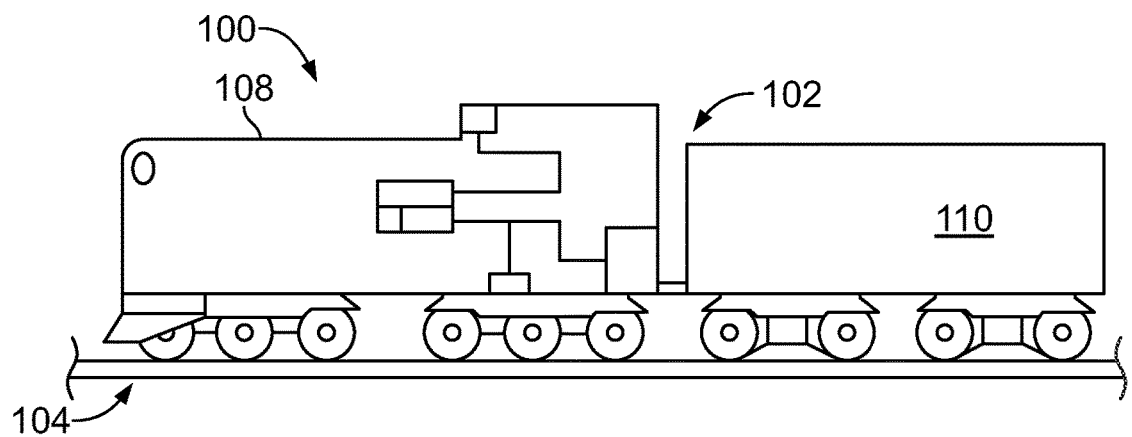
FIG. 1 illustrates a block schematic diagram of a vehicle system.

FIG. 1 illustrates a schematic diagram of a vehicle system 100 that includes a control system 102. The vehicle system 100 may use a battery that includes a busbar that is manufactured using a manufacturing process as described herein. The vehicle system may travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles.

Figure 2:
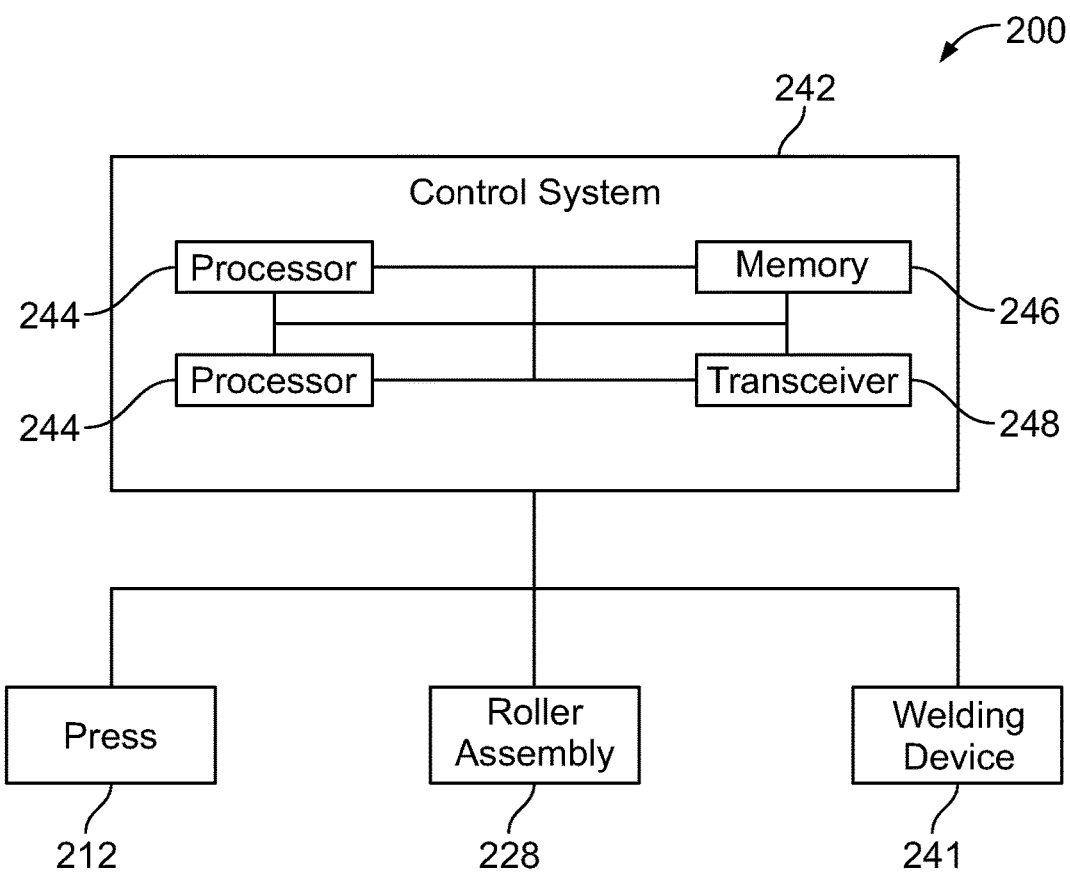
FIG. 2 illustrates block schematic diagram of a control system.

FIG. 2 provides a schematic block diagram of an assembly 200 for manufacturing a busbar 202 that includes a tab 204 that has a first tab portion 206, a second tab portion 208, and an indentation 210. Any component of the assembly may be utilized by an individual, or alternatively, controlled by a control system.

Figure 3A:
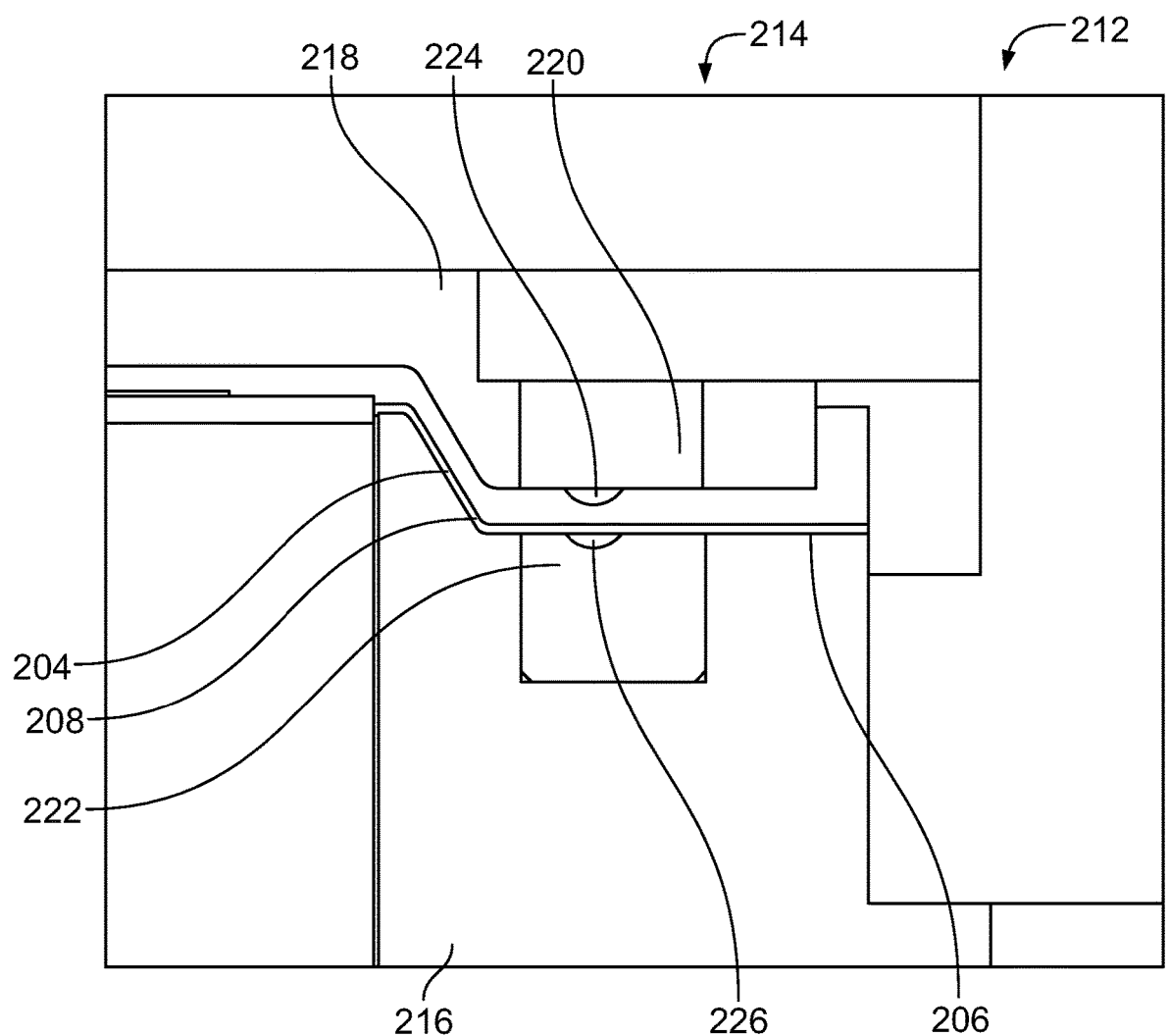
FIG. 3A illustrates a schematic diagram of a press.
Figure 3B:
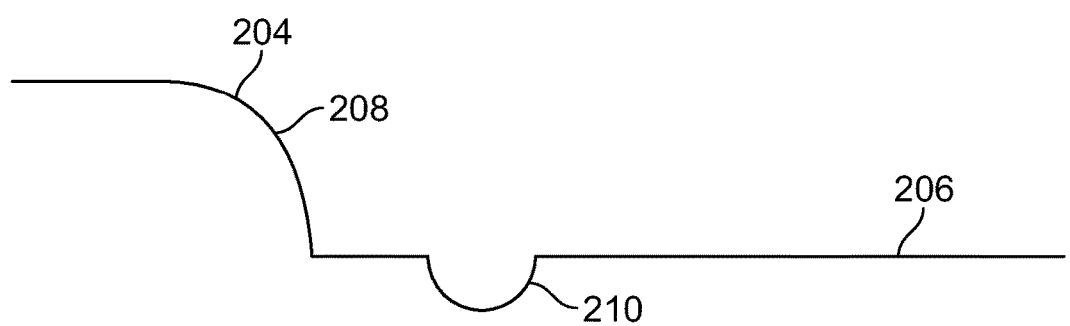
FIG. 3B illustrates a side plan view of a tab during a manufacturing process.

The assembly 200 includes a press 212 that may form the indentation within the tab. In one example, the press can be a punch press. FIG. 3A illustrates a partial view of the press in additional detail. Specifically, the press 212 has a housing 214 that includes a fixed press component 216 and an actuating press component 218. The fixed component does not move during the press process, and the tab is secured to the fixed component for indentation. Meanwhile, the actuating press component moves from a first position above the fixed press component to a second position against a tab on the fixed press component. The actuating press component may be moved manually, pneumatically, etc. to provide a compression force on a tab. Coupled within the actuating press component is a first insert 220 that is positioned above a second insert 222 that is coupled within the fixed press component. The first insert includes a press indentation 224 that is received by a notch 226 disposed within the second insert. The indentation and notch mate with each other. In this manner, when the tab of the busbar is secured to the fixed press component and the actuating press component engages the tab and compresses against the fixed press component, the indentation is formed within the tab as illustrated in FIG. 3B.

With reference back to FIG. 2, the assembly also includes a roller assembly 228 that receives the busbar after plural tabs of the busbar have been disposed through corresponding openings within the busbar. In particular, each tab is disposed in the busbar opening such that the first tab portion extends upward from the opening, and the second tab portion extends downward through the opening, and may be clamped to the busbar.

The roller assembly is illustrated in more detail in FIG. 4. The roller assembly includes an end cap 232 upon which the busbar moves laterally. In particular, the busbar may be secured to the end cap to prevent movement relative to the end cap itself. Disposed above the end cap is a block element 234 that may engage the first tab portion of the busbar to bend the first tab portion about the indentation. In one example, the block element includes an arcuate surface 236 between a first end 238 and second end 239. The arcuate surface engages the first tab portion and facilitates the bending of the first tab portion about the indentation. In other examples, the block element includes an inclined plane surface, a flat surface, etc. to push over the first tab portion.

The roller assembly also includes a rolling element 240 that may compress the first tab portion against the busbar. The rolling element may be positioned adjacent the block element such that as the busbar moves along the end cap, first the block element bends the first tab portion downwardly to an angle with the end cap, and second the rolling element compresses the first tab portion against the busbar to flatten the first tab portion. The rolling element may be a wheel, an end cap, etc. that compresses the first tab portion against the busbar. The rolling element may be positioned at a height equal to the width of the first tab position away from the busbar. In this manner, the first tab portion is completely flattened against the busbar after exiting the roller assembly. While a rolling element may be utilized in one example, a straight press, paddle, or other compression device may be utilized to compress the first tab portion against the busbar.

As a result of the indentation placed in the tab, when the block element, and rolling element bend and compress the first tab portion about the indentation, the force applied to the tab is distributed through the indentation and to the second tab portion. By spreading the force, at the same indentation location for plural tabs on the busbar, a uniform compression is provided for each individual tab.

With reference back to FIG. 2, the assembly may also include a welding device 241 that may weld the first tab portion of the tab to the busbar. The welding device may be a laser welder, ultrasound welder, or the like. The welding device may be manually operated by a worker, or may operate automatically as an automated welding device that is within an assembly line. The welding device may weld similar materials, or different materials together. By spreading the force at the same indentation location for plural tabs on the busbar, uniform welding is facilitated. To this end, poor welding conditions, as a result of the first tab portion extending away from the busbar, are similarly reduced. Consequently, damage to the battery through tearing of foil or other package related deficiencies is also reduced, improving overall life of the battery.

The assembly optionally may also include a control system 242. The control system may include one or more processors 244, a memory or storage device 246, and a transceiver 248 for communicating data and information. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like. The control system may be communicatively coupled to each of the press, roller assembly, and weld device to automate each during operation. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like.

In one example, the press, roller assembly, and weld device are all controlled by the control system. Alternatively, the control system only controls either one of, or two of the press, roller assembly, and weld device. In yet another example, a control system is not utilized, and each of the press, roller assembly, and weld device are manually operated by an individual.

Figure 5:
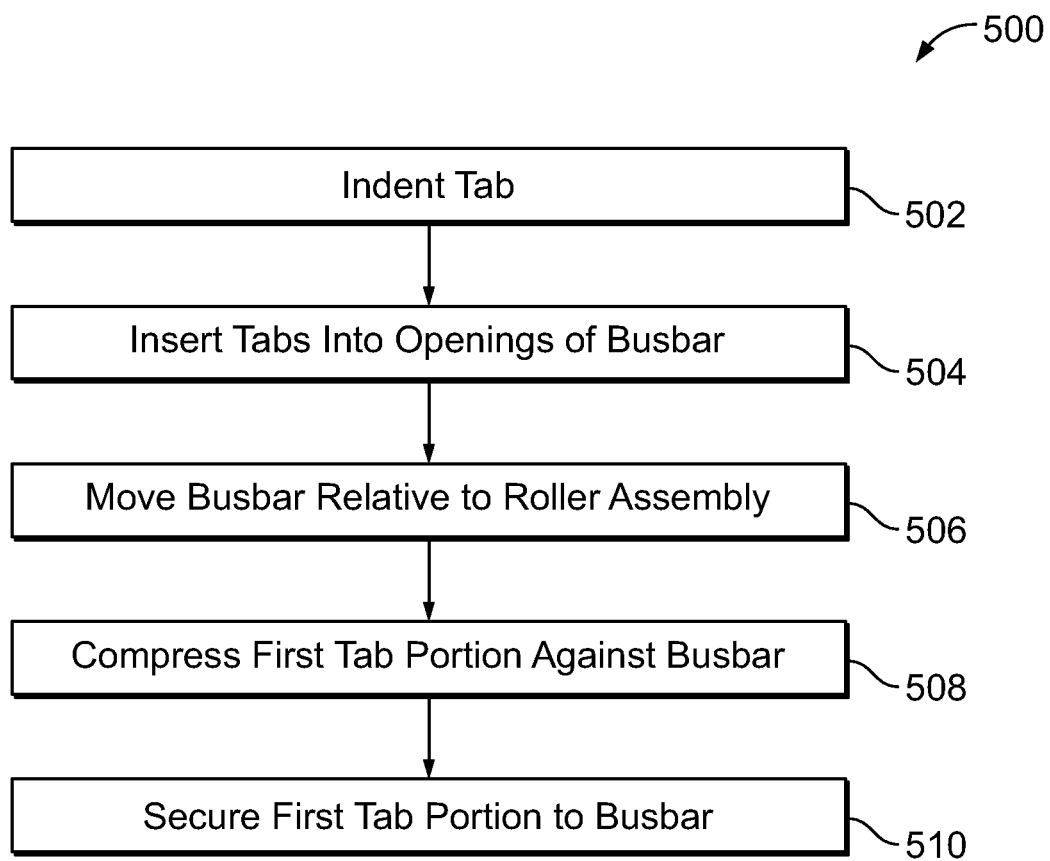
FIG. 5 illustrates a block schematic diagram of a process for manufacturing a busbar.

FIG. 5 illustrates a block flow diagram of a process 500 for manufacturing a busbar. In one example, the busbar is utilized within a battery cell for a vehicle system as described in relation to FIG. 1. In another example, the busbar is manufactured utilizing the assembly described in relation to FIG. 2.

At step 502, a tab is indented to configure the tab to be coupled to a busbar, and to form a first tab portion and a second tab portion separated by an indentation. In one example, the tab is inserted into a press that includes a first insert with a press indentation, and a second insert with a press notch that matingly receives the press indentation. The press may include an actuating press component and a fixed press component where the actuating press component moves from a first position above the fixed press component to a second position compressed against a tab positioned on the fixed press component. In one example, plural tabs may be feed into the press one at a time. Once a tab is positioned in a correct location, the actuating press component moves to compress the tab to form the indentation. The press may be feed and operated automatically by a control system, or manually by an operator.

At step 504, plural tabs are inserted into corresponding openings within a busbar. Each busbar includes at least one opening that receives a tab. Each tab is disposed into a separate opening, where a first portion of the tab extends in a first direction, such as an upward direction, from the opening, while a second portion of the tab extends in a second direction, such as a downward direction from the opening. The indentation is thus aligned with the inner wall of the opening. In one example, the second portion of the tab may be secured, or clamped to the busbar to hold the tab in place during the manufacturing process.

At step 506, as the busbar moves relative to a roller assembly, the first tab portion engages a block element to bend the first tab about the indentation. In one example, the busbar is on an end cap that holds the busbar in place against the end cap, and moves the busbar along the end cap relative to the block element. Alternatively, the busbar may be placed on a fixed surface, and the block element may move relative to the fixed surface to laterally engage the first tab portion of the tab.

In one embodiment, the block element includes an arcuate surface that gradually bends the first tab portion downwardly about the indentation. Alternatively, the block element may include an inclined surface, flat surface, etc. As the first tab portion engages the block element, the block element pushes the first tab portion downward such that after disengaging the block element the first tab portion is at an acute angle to the busbar. In this manner, the first tab portion is bent and positioned for the roller element to compress the first tab portion against the busbar.

At step 508, the first tab portion is compressed against the busbar by bending the first tab portion about the indentation. In one example, a rolling element engages the first tab portion and bends the first tab portion about the indentation as the rolling element compresses the first tab portion against the busbar. Specifically, as the busbar moves laterally relative to the rolling element, the rolling action gradually bends the first tab portion, ensuring force is concentrated through the indentation to the second tab portion of the tab. Alternatively, other compressing devices other than a rolling element may be utilized to compress and bend the first tab portion about the indentation. When the first tab portion is compressed against the busbar, the tab is considered in a weld position.

At step 510, the first tab portion is secured to the busbar. In one example, the first tab portion is welded to the busbar. More specifically, the first tab portion may be laser welded, ultrasonic welded, or the like to the busbar. In one example, plural tabs are on a busbar such that a first tab portion of a first tab is welded to the busbar, followed with a first tab portion of a second tab, and a first tab portion of a third tab. In examples, there may be less than three first tab portions secured to the busbar, or more than three first tab portions secured to the busbar. In all, by utilizing the method provided, a consistent and repeatable weld may be provided, reducing packaging issues related to the tabs.

Figure 6A:
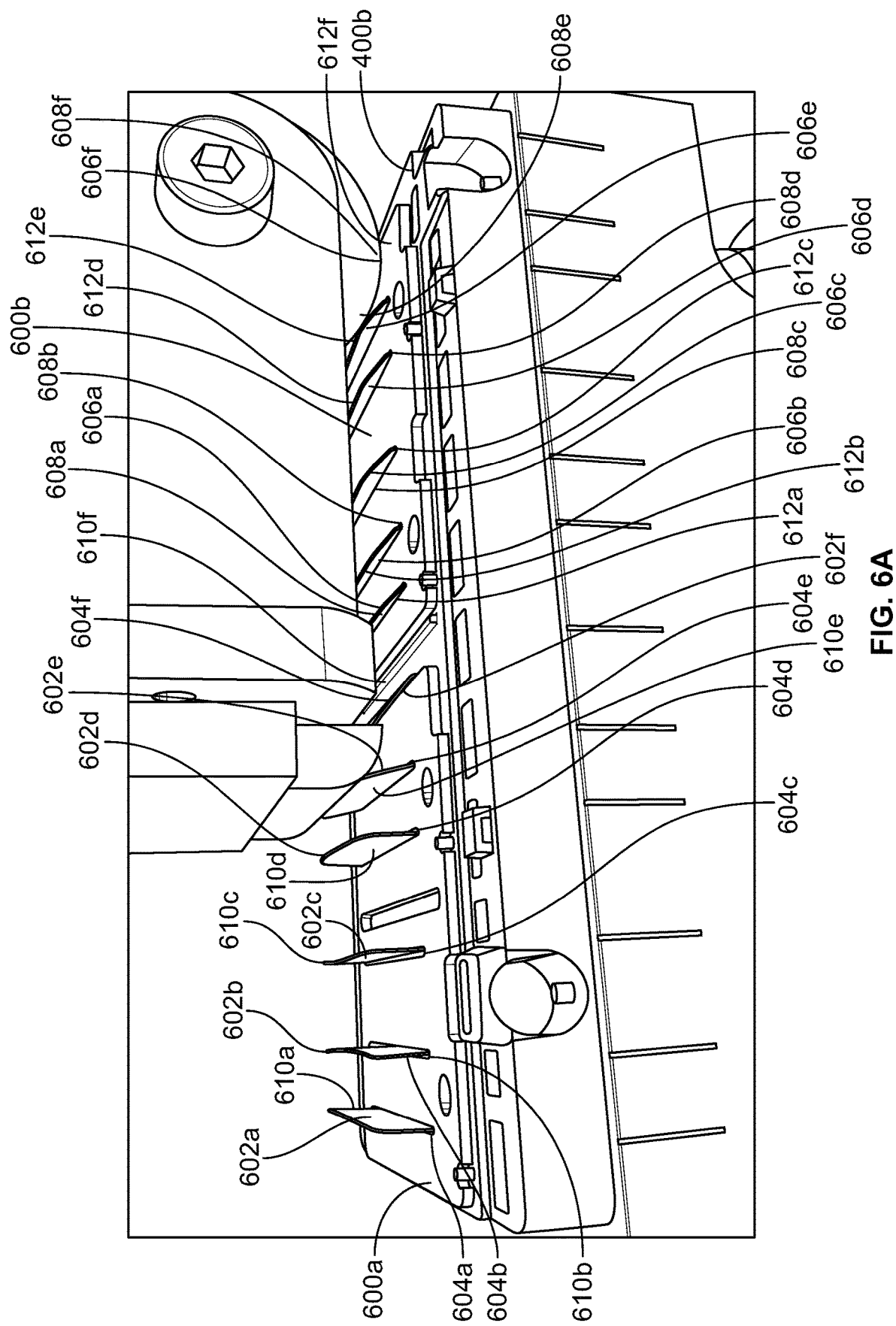
FIG. 6A illustrates a side perspective view of a busbar during a manufacturing process.

FIG. 6A illustrates a first busbar 600A with plural tabs 602A-F (first tab 602A, second tab 602B, third tab 602C, fourth tab 602D, fifth tab 602E, and sixth tab 602F) disposed through plural openings 604A-F (first opening 604A, second opening 604B, third opening 604C, fourth opening 604D, fifth opening 604E and sixth opening 604F) and a second busbar 600B with plural tabs 606A-F (first tab 606A, second tab 606B, third tab 606C, fourth tab 606D, fifth tab 606E, and sixth tab 606F) disposed through plural openings 608A-F (first opening 608A, second opening 608B, third opening 608C, fourth opening 608D, fifth opening 608E, and 608F) during the compression process. FIG. 6B meanwhile illustrates the first and second busbars after the compression process. As illustrated, the first tab portion 610A-F, and 612A-F of each tab initially is nearly perpendicular to the busbar at a first position. Then, after engaging the block element, each first tab portion is bent to a second position at an acute angle to each busbar, respectfully.

After each busbar goes through the rolling element, each first tab portion is at a final position, or weld position flat against the respective busbar that is nearly horizontal or parallel to the busbar. As illustrated in FIG. 6B, each first tab portion is uniformly linear nearly against the busbar surface. This is the result of the indentation in each tab that transfers the force of both the block element and rolling element to the correct location to ensure uniformity. As a result, compliance to avoid a thin inner layer of foil of a battery cell is protected from damage, while a consistent co-linear surface is provided for tab welding. In addition, variation from tab to tab may also be eliminated.

FIG. 6C illustrates the first busbar after the welding process. The first tab portions are uniformly secured against the busbar providing a secure coupling between the busbar and tab. As a result, the tab encompasses a reduced amount of vertical space compared to tabs not undergoing the process described herein. Consequently, the tab is less likely to catch on foil of a battery, causing damage to the battery, reducing battery failures.

In one or more embodiments, a method is provided that includes indenting a tab that may be coupled to a busbar for a battery to form a first tab portion and a second tab portion separated by an indentation, compressing a first tab portion against the busbar by bending the first tab portion about the indentation, and securing the first tab portion to the busbar.

Optionally, the method may also include disposing the tab through an opening in the busbar such that the first tab portion extends away from the opening in an upward direction, and the second tab portion extends away from the opening in a downward direction. In one aspect, the method may also include clamping the tab to the busbar before compressing the first tab portion against the busbar and securing the first tab portion to the busbar. In one example, compressing the first tab portion against the busbar may include compressing the first tab portion with a rolling element as the rolling element moves relative to the busbar. Alternatively, before compressing the first tab portion against the busbar with the rolling element, the method may include pushing the first tab portion downward to bend the first tab portion about the indentation.

Optionally, securing the first tab portion to the busbar may include laser welding the first tab portion to the busbar. In one aspect, the tab may be a first tab and the opening in the busbar may be a first opening, and the busbar may include a second opening that receives a second tab having a first tab portion and a second tab portion separated by an indentation. The method may also include compressing the first tab portion of the second tab against the busbar by bending the first tab portion of the second tab about the indentation of the second tab, and securing the first tab portion of the second tab to the busbar. In another aspect, the first tab portion of the first tab and the first tab portion of the second tab may be compressed by a rolling element that moves relative to the busbar.

In one or more embodiments, an assembly is provided that may include a press that may form an indentation within a tab, a roller assembly including a rolling element that may compress a first tab portion of the tab that extends from the indentation against a busbar, and a welding device that may weld the first tab portion of the tab to the busbar.

Optionally, the roller assembly may also include a block element that may engage the first tab portion to bend the first tab portion about the indentation before the first tab portion is compressed by the rolling element. In one aspect, the block element may have an arcuate surface that engages the first tab portion to bend the first tab portion about the indentation. In another aspect, the roller assembly may include an end cap that may receive the busbar and move the busbar relative to the block element and rolling element. In one example, the press may include a first insert that is matingly received by a second insert. In another example, the welding device may be a laser welder.

In one or more embodiments, a method is provided that may include indenting a tab that may be coupled to a busbar for a battery to form a first tab portion and a second tab portion separated by an indentation, and inserting the tab into an opening in the busbar such that the first tab portion extends away from the opening. The method may also include bending the first tab portion about the indentation to a welding position adjacent the busbar, and welding the first tab portion to the busbar.

Optionally, the method may also include clamping the second tab portion of the tab to the busbar before bending the first tab portion about the indentation. In one aspect, bending the first tab portion about the indentation to a welding position adjacent the busbar may include pushing the first tab portion downward with a block element, and compressing first tab portion with a rolling element after pushing the first tab portion downward with the block element. In another aspect, welding the first tab portion to the busbar may include laser welding the first tab portion to the busbar.

In one example, the tab may be a first tab and the opening in the busbar may be a first opening, the welding position may be a first welding position, and the busbar may include a second opening that receives a second tab that may have a first tab portion and a second tab portion separated by an indentation. The method may also include bending the second tab portion about the indentation of the second tab to a second welding position adjacent the busbar the first tab portion, and welding the first tab portion of the second tab to the busbar. Additionally, the first tab portion of the first tab and the first tab portion of the second tab may be compressed by a rolling element that moves relative to the busbar.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
indenting a tab configured to be coupled to a busbar for a battery to form a first tab portion and a second tab portion separated by an indentation;
compressing the first tab portion against the busbar by bending the first tab portion at the indentation; and
securing the first tab portion to the busbar.

2. The method of claim 1, further comprising:
disposing the tab through an opening in the busbar such that the first tab portion extends away from the opening in an upward direction, and the second tab portion extends away from the opening in a downward direction.

3. The method of claim 2, further comprising:
clamping the tab to the busbar before compressing the first tab portion against the busbar and securing the first tab portion to the busbar.

4. The method of claim 1, wherein compressing the first tab portion against the busbar includes compressing the first tab portion with a rolling element as the rolling element moves relative to the busbar.

5. The method of claim 4, wherein before compressing the first tab portion against the busbar with the rolling element, the method comprises pushing the first tab portion downward to bend the first tab portion at the indentation.

6. The method of claim 1, wherein securing the first tab portion to the busbar includes laser welding the first tab portion to the busbar.

7. The method of claim 2, wherein the tab is a first tab and the opening in the busbar is a first opening, and wherein the busbar includes a second opening that receives a second tab having a first tab portion and a second tab portion separated by an indentation, the method further comprising:
   compressing the first tab portion of the second tab against the busbar by bending the first tab portion of the second tab at the indentation of the second tab; and
   securing the first tab portion of the second tab to the busbar.

8. The method of claim 7, wherein the first tab portion of the first tab and the first tab portion of the second tab are compressed by a rolling element that moves relative to the busbar.

9. An assembly comprising:
   a press configured to form an indentation within a tab;
   a roller assembly including a rolling element configured to compress a first tab portion of the tab that extends from the indentation against a busbar to bend the tab at the indentation; and
   a welding device configured to weld the first tab portion of the tab to the busbar.

10. The assembly of claim 9, wherein the roller assembly also includes a block element configured to engage the first tab portion to bend the first tab portion at the indentation before the first tab portion is compressed by the rolling element.

11. The assembly of claim 10, wherein the block element has an arcuate surface that engages the first tab portion to bend the first tab portion at the indentation.

12. The assembly of claim 10, wherein the roller assembly includes an end cap configured to receive the busbar and move the busbar relative to the block element and the rolling element.

13. The assembly of claim 9, wherein the press includes a first insert that is matingly received by a second insert.

14. The assembly of claim 9, wherein the welding device comprises a laser welder.

15. A method comprising:
   indenting a tab configured to be coupled to a busbar for a battery to form a first tab portion and a second tab portion separated by an indentation;
   inserting the tab into an opening in the busbar such that the first tab portion extends away from the opening;
   bending the first tab portion at the indentation to a welding position adjacent the busbar; and
   welding the first tab portion to the busbar.

16. The method of claim 15, further comprising:
   clamping the second tab portion of the tab to the busbar before bending the first tab portion at the indentation.

17. The method of claim 15, wherein bending the first tab portion at the indentation to the welding position adjacent the busbar comprises:
   pushing the first tab portion downward with a block element; and
   compressing the first tab portion with a rolling element after pushing the first tab portion downward with the block element.

18. The method of claim 15, wherein welding the first tab portion to the busbar comprises laser welding the first tab portion to the busbar.

19. The method of claim 15, wherein the tab is a first tab and the opening in the busbar is a first opening, the welding position is a first welding position, and wherein the busbar includes a second opening that receives a second tab having a first tab portion and a second tab portion separated by an indentation, the method further comprising:
   bending the second tab portion at the indentation of the second tab to a second welding position adjacent the busbar the first tab portion; and
   welding the first tab portion of the second tab to the busbar.

20. The method of claim 19, wherein the first tab portion of the first tab and the first tab portion of the second tab are compressed by a rolling element that moves relative to the busbar.

* * * * *